United States Patent [19]

Beardwood

[11] Patent Number: 5,578,246
[45] Date of Patent: Nov. 26, 1996

[54] CORROSION INHIBITING COMPOSITIONS FOR AQUEOUS SYSTEMS

[75] Inventor: Edward S. Beardwood, Ontario, Canada

[73] Assignee: Ashland Inc., Columbus, Ohio

[21] Appl. No.: 317,133

[22] Filed: Oct. 3, 1994

[51] Int. Cl.$^6$ .................... C23F 5/10; C02F 5/14
[52] U.S. Cl. ........... 252/389.23; 252/387; 252/389.62; 252/391; 252/396; 252/180; 252/181; 210/696; 210/698; 210/699; 210/701; 422/15; 422/16; 422/17; 422/18
[58] Field of Search ............... 252/70, 74, 387, 252/68, 180, 181, 389.23, 389.62, 391, 396; 210/697, 696, 701, 699, 698; 422/15, 16, 17, 18

[56] References Cited

U.S. PATENT DOCUMENTS

| | | | |
|---|---|---|---|
| 3,898,037 | 8/1975 | Lange et al. | 422/16 |
| 3,928,196 | 12/1975 | Persinski et al. | 210/701 |
| 3,962,109 | 6/1976 | Oberhofer et al. | 252/146 |
| 3,965,027 | 6/1976 | Boffardi et al. | 252/180 |
| 4,029,577 | 6/1977 | Godlewski et al. | 210/701 |
| 4,085,063 | 4/1978 | Liu | 252/387 |
| 4,470,272 | 9/1984 | Itoh et al. | 252/68 |
| 4,487,712 | 12/1984 | Wilson et al. | 252/78.3 |
| 4,501,667 | 2/1985 | Cook | 210/700 |
| 4,502,978 | 3/1985 | Romberger et al. | 252/389.2 |
| 4,508,684 | 4/1985 | Huff et al. | 252/68 |
| 4,655,951 | 4/1987 | Hanazaki et al. | 252/68 |
| 4,659,482 | 4/1987 | Chen | 210/699 |
| 4,664,884 | 5/1987 | Mullins et al. | 422/13 |
| 4,707,286 | 11/1987 | Carr | 252/75 |
| 4,759,851 | 7/1988 | Chen | 210/697 |
| 5,087,717 | 2/1992 | Jung et al. | 556/416 |
| 5,126,069 | 6/1992 | Kud et al. | 252/174.23 |
| 5,290,496 | 3/1994 | Carduck et al. | 264/142 |

*Primary Examiner*—Sharon Gibson
*Assistant Examiner*—Valerie Fee
*Attorney, Agent, or Firm*—David L. Hedden

[57] ABSTRACT

This invention relates to a metal corrosion inhibiting composition comprising in admixture: (a) an anodic silicate salt; (b) a silicate salt stabilizer; (c) a cathodic corrosion inhibitor; and water. Preferably, the corrosion inhibiting composition also contains a polymeric scale inhibitor. The invention also relates to a process for treating an open aqueous system with the corrosion inhibiting composition.

10 Claims, No Drawings

CORROSION INHIBITING COMPOSITIONS FOR AQUEOUS SYSTEMS

FIELD OF THE INVENTION

This invention relates to a metal corrosion inhibiting composition comprising in admixture: (a) an anodic silicate salt; (b) a silicate salt stabilizer; and (c) a cathodic corrosion inhibitor. Preferably the composition also contains a polymeric scale inhibitor. The invention also relates to a process for treating an open aqueous system with the corrosion inhibiting composition.

BACKGROUND FOR THE INVENTION

There are various corrosion inhibiting compositions which are effective in cooling water systems with respect to mild steel and copper. Except for silicate salts, typical corrosion inhibitors have been characterized as environmental pollutants. For example, phosphates, nitrites, nitrates and borates are potential algae nutrients when discharged from wastewater. Algae blooms, in turn, give rise to eutrophication of water. It is also believed that phosphonates will behave similarly.

Chromate/zinc based corrosion inhibiting compositions for open cooling water corrosion inhibition have long been used commercially and are extremely effective. However, heavy metals have been identified as carcinogens and toxins. Therefore, the level of heavy metals admissible to the environment is restricted. With increased environmental awareness, corrosion inhibiting compositions based upon heavy metals are now unacceptable.

High inorganic phosphate/organic phosphate blends have been substituted for corrosion inhibiting compositions containing heavy metals, but there is now an environmental concern with phosphate discharge. This has lead to the use of lower amounts of inorganic phosphate/organic phosphates blends. Care must also be taken when using inorganic phosphate/organic phosphate blends because they can contribute fouling and/or pitting.

It is known to use silicates in potable water circuits as a corrosion inhibitor and that silicates are non toxic and will not cause stress to the environment. It is also known that silicates and their combination with other inhibitors, such as nitrate, nitrite, orthophosphate, molybdate, azoles, and borate can be used in closed automotive cooling circuits with successful mitigation of corrosion. This is because in closed cooling circuits, fresh water is not continuously added since there is no significant loss of fluid due to evaporation. Consequently, fluid impurities resulting from evaporation are not concentrated in the system.

However, in open evaporative recirculating cooling water circuits, the use of silicates has not been successful compared to chromate/zinc, inorganic phosphate blends, zinc phosphonate, and organic phosphonates. This is because in open recirculating cooling water circuits, fresh water is added to the cooling fluid due to evaporative losses, and fluid impurities are concentrated due to evaporation. Such losses from the bulk recirculating water also results in the reduction in the amount of silicate inhibitor available for corrosion inhibitory film formation and film maintenance.

Furthermore, over time, changes in the pH and temperature of the system water will promote the formation of polymeric silicates from naturally occurring monomeric silicates in the system water. These polymeric silicates decrease the functioning of the corrosion inhibiting compositions in the system water and increase the potential for foulant deposition. Also, since the performance of silicate based corrosion inhibitors against pitting and fouling are known to be pH sensitive and temperature sensitive, it is believed that they may promote the formation of magnesium silicate on the metal surfaces which come into contact with the circulating water. Because of these problems, there is skepticism about using silicate based corrosion inhibiting compositions in open cooling systems.

SUMMARY OF THE INVENTION

This invention relates to a silicate-based metal corrosion inhibiting composition, free of heavy metals and low in phosphorus, comprising in admixture:

(a) an anodic silicate salt in an amount of 5.0 parts to 30.0 parts by weight, based upon 100 parts of corrosion inhibiting composition;

(b) a silicate salt stabilizer in an amount of 1.0 parts to 5.0 parts by weight, based upon 100 parts of corrosion inhibiting composition;

(c) a cathodic corrosion inhibitor in an amount of 0.5 to 4.0 parts by weight, based upon 100 parts of corrosion inhibiting composition; and (d) water in an amount of from 55 to 95 parts by weight based on upon the weight of the corrosion inhibiting composition.

Preferably the corrosion inhibiting composition also contains a polymeric scale inhibitor in an amount of 0.5 part to 3.0 parts by weight, based upon 100 parts of corrosion inhibiting composition.

The corrosion inhibiting compositions do not cause undue stress to the environment because they do not contain any heavy metals and are low in phosphorous, i.e. <0.8 ppm, preferably <0.6 ppm, based upon the water to be treated. Thus they have minimal impact on the environment when discharged to natural water ways. The subject corrosion inhibitors outperform silicates alone and are comparable in performance to corrosion inhibitors based on chromate and zinc in open recirculating cooling systems. They inhibit both anodic and cathodic driven corrosion. They achieve this performance without the formation of appreciable silica or "magnesium silicate" on the metal surfaces which come into contact with the circulating water. They are particularly useful in open cooling water systems.

The invention also relates to a process for treating an open aqueous system with the corrosion inhibiting composition.

ENABLING DISCLOSURE AND BEST MODE

The subject corrosion inhibitor compositions can be used in all aqueous systems, but are particularly useful for open cooling systems. Although the corrosion inhibiting compositions are particular useful for inhibiting the corrosion of mild steel, but they are also useful for other ferrous and non ferrous metals, including aluminum, copper, lead and zinc bearing alloys. The compositions are particularly useful in aqueous systems having a pH of 6.5 to 8.5, preferably 7.0 to 8.0.

Silicate Salts

Anodic silicate salts are typically made by fusing $SiO_2$ with alkali. metal carbonates. Preferably used as the silicate salt is sodium silicate, particularly metasilicate ($Na_2SiO_3$) and sodium orthosilicate, ($Na_4SiO_4$), which are isolated by fractional crystallization from high pH water extracts. Other silicate salts which can be used are alkali metal (Group I A) silicate salts and ammonium silicate salts. The amount of silicate salt used is from 5 parts to 30 parts, preferably 10 to 20 parts based upon 100 parts of corrosion inhibiting composition.

Silicate Salt Stabilizers

Silicate salt stabilizers may be polymeric or non polymeric. Borates and orthoborates are examples of non polymer silicate salt stabilizers. Preferably polymeric silicate salt stabilizers are used. Specific examples of polymeric silicate salt stabilizers include those described in U.S. Pat. No. 5,277,823 which is hereby incorporated by reference. Particularly useful are water soluble terpolymers of (meth)acrylic acid or maleic acid or salts thereof having a weight average molecular weight from about 1000 to about 25,000 where the terpolymer is as described in U.S. Pat. No. 5,277,823. A specific example of such a terpolymer is ACUMER 5000 sold by Rhom & Haas. Copolymers of acrylic acid/hydroxylated lower alkyl acrylates can also be used as the silicate salt stabilizers, particularly those described in U.S. Pat. No. 4,029,577 which is hereby incorporated by reference. The amount of silicate salt stabilizer used is from 1 part to 5 parts, preferably 1.5 parts to 4.0 parts based upon 100 parts of corrosion inhibiting composition.

Polymeric Scale Inhibitor

Polymeric scale inhibitors polymers capable of inhibiting and/or controlling scale formation on metal surfaces in an aqueous system. Polymeric scale inhibitors include polymers based upon (meth)acrylic acid and maleic acid. Co- and terpolymers of (meth)acrylic acid and 2-acrylamido-2 methyl propane sulfonic acid (AMPS) are particularly useful for inhibiting scale caused by sulfates, carbonates, and phosphate. Examples of polymeric scale inhibitors are described in U.S. Pat. Nos. 3,332,904; 3,692,673; 3,709, 815; 3,709,816; 3,928,196; 3,806,367; and 3,898,037 which are hereby incorporated by reference. A specific example of a commercially available terpolymer which effective controls scale in aqueous systems is ACUMER 2000 sold by Rhom & Haas. The amount of polymeric scale inhibitor used is from 0.5 part to 3.0 parts, preferably 0.5 part to 1.5 parts based upon 100 parts of corrosion inhibiting composition.

Cathodic Corrosion Inhibitor

Cathodic corrosion inhibitors typically used are inorganic phosphates and phosphonates. Preferred as the cathodic corrosion inhibitor are phosphonates, particularly hydroxyphosphono acetic acid. The amount of cathodic corrosion inhibitor is such that the total amount of phosphorus in the corrosion inhibiting composition is less than 4% based upon the weight of the corrosion inhibiting composition which results in less than 0.8 ppm of phosphorus, preferably less than 0.6 ppm, based upon the amount of water treated. The amount of cathodic corrosion inhibitor used is from 0.5 part to 4.0 parts, preferably 1.0 part to 2.0 part based upon 100 parts of corrosion inhibiting composition.

Water

The amount of water used in the corrosion inhibiting compositions is from 55 to 95 parts by weight, preferably from 60 to 90 parts by weight, and most preferably from 65 to 85 parts by weight, said parts being based upon 100 parts by weight of corrosion inhibiting composition.

Typically, the corrosion inhibiting composition is sold as a Part I and Part II component where the Part I contains the anodic silicate salt, and Part II contains the silicate salt stabilizer, scale controlling polymer, cathodic corrosion inhibitor, and water. The Part I and Part II are mixed by conventional mixing means. The amount of corrosion inhibiting composition used to treat an aqueous system is from 0.1 mg/l to 500 mg/l based upon the liters of water treated, preferably from 100 mg/l to 200 mg/l.

ABBREVIATIONS AND DEFINITIONS

The following abbreviations were used in the examples:
ACUMER=is a tradename of Rohm & Haas. for water soluble polymers.
AVE LPR=average linear polarization. corrosion rates in mpy.
CaH=in ppm of calcium as $CaCO_3$.
CL=in ppm of chlorides as chlorine.
CONDUCTIVITY=conductivity in mmhos/cm.
HPAA=hydroxyphosphono acetic acid. (FMC BELCOR 575/50% AI).
MgH=ppm of magnesium as $CaCO_3$.
mph=corrosion rate as mils per year.
M/ALK=ppm total alkalinity as $CaCO_3$.
$SO_4$=ppm sulfate as $SO_4$.
SILICA=in ppm as $SiO_2$.
SIL OVER=silicate overlay in ppm as $SiO_2$ where silica overlay is the amount of monomeric silicate which is added to the system water treated in the examples.
Sodium silicate N=$nNa_2O \cdot mSiO_2$ where m:n$\geq$2.5:3.
Sodium silicate M=$Na_2O$ :$mSiO_2$ where m:n>2.
TH=total hardness in ppm as $CaCO_3$.

EXAMPLES

In the following examples, the corrosion inhibiting compositions were prepared by mixing the components in the amounts given in Table II. Control Example A illustrates the use of a silicate alone. Control Example B illustrates the use of a commercially used formula containing chromium and zinc. Example 1 contains a silicate salt, a silicate salt stabilizer (ACUMER 5000), a polymeric scale inhibitor (ACUMER 2000), and a cathodic corrosion inhibitor (HPAA). All trials were run by adding the corrosion inhibiting compositions to an open recirculating evaporative cooling system using potable water unless otherwise specified. Corrosion was measured with a PULSE performance monitor (NACE RPO 189-89 and Linear Polarization Corrator) using NACE standard corrosion coupons. The parameters for the fouling test set up (NACE RPO 189-89) were:
Velocity ft/sec—2.28
Inlet temperature °F.—90–100
Heat Flux Btu/hr/ft$^2$—12,000–13,000.
Units for the fouling factor were (Btu/hr/ft$^2$/°F$\times 10^{-5}$). A fouling factor value of $50\times 10^{-5}$ Btu/hr/ft$^2$/°F. is not considered to cause loss of cooling efficiency.

The metal coupon materials used in the tests were as follows:

| Metal tested | Coupon used |
| --- | --- |
| Mild steel | C 1020 |
| Copper | CDA 110 |
| Stainless steel | Type E 316 |

The water used in the examples is described in Table I which follows:

TABLE I

| (PROPERTIES OF WATER USED IN EXAMPLES) | | | |
|---|---|---|---|
| | EXAMPLE | | |
| PROPERTY OF $H_2O$ | A | B | 1 |
| TH | 9.2 | 60 | 60 |
| CaH | 7.6 | 40 | 40 |
| MgH | 1.6 | 20 | 20 |
| M/ALK | 22 | 44 | 52 |
| $SO_4$ | <1.0 | <1.0 | <1.0 |
| CL | 6.0 | 10 | 10 |
| CONDUCTIVITY | 114 | 140 | 140 |
| SILICA | 6.6 | 28 | 28 |
| pH | 6.96 | 7.4 | 7.9 |

The corrosion inhibiting compositions used in the examples are described in Table II. The amount of corrosion inhibiting composition used was 200 mg/l based on the aqueous system treated. Various properties of the compositions are also given such as corrosion rates (25 day duration) for mild steel, copper, stainless steel, average LPR for mild steel, and the results of pitting tests.

TABLE II

| | EXAMPLE NUMBER | | |
|---|---|---|---|
| | A | B | 1 |
| COMPONENT | | | |
| SILICATE | 30.0 | 0 | 20.0 |
| ACUMER 5000 | 0 | 0 | 3.75 |
| ACUMER 2000 | 0 | 0 | 1.0 |
| HPAA | 0 | 0 | 2.0 |
| CHROMIUM | 0 | 10.0 | 0 |
| ZINC | 0 | 1.0 | 0 |
| WATER | 70 | 89 | 73.25 |
| Ave. fouling factor | — | 0 | 24.4[1] |
| Corrosion/metal/mph | | | |
| mild steel | 0.0971 | 0.11 | 0.08 |
| copper | — | 0.03 | NIL |
| stainless steel | — | — | 0.05 |
| Ave. LPR mild steel | — | 0.342 | 0.486 |
| Pitting[2] | YES | NO | NO |

[1] A fouling factor value of $24.4 \times 10^{-5}$ Btu/hr/ft$^2$/°F. is considered acceptable by industrial standards.
[2] Pitting was determined by visual/microscopic examination.

The results in Table II show that it is possible, by using the specified components in the amounts specified, to formulate an effective corrosion inhibitor for aqueous systems which is low in phosphorus and does not contain heavy metals. Such a corrosion inhibiting composition creates less stress to the environment and its corrosion inhibiting effect is surprising in view of experiences with silicates in open cooling systems.

I claim:

1. A silicate-based metal corrosion inhibiting composition for open cooling systems comprising in admixture:

(a) an anodic silicate in the amount of 5 parts to 30 parts by weight based upon 100 parts of corrosion inhibiting composition;

(b) a silicate salt stabilizer having a weight average molecular weight from about 1000 to about 25,000, wherein said silicate salt stabilizer is a terpolymer comprising monomeric units selected from the group consisting of (i) (meth) acrylic acid, (ii) maleic acid, (iii) salts thereof, and (iv) mixtures of (i), (ii), or (iii); and where the silicate salt stabilizer is used in an amount of 1.0 parts to 5.0 parts by weight, based upon 100 parts of corrosion inhibiting composition;

(c) a cathodic corrosion inhibitor which is an anodic hydroxy phosphonic acetic acid salt in an amount of 0.5 parts to 4.0 parts, based upon 100 parts of corrosion inhibiting composition;

(d) a polymeric scale inhibitor selected from the group consisting of copolymers of (1)(meth)acrylic acid and 2-acrylamido-2-methyl propane sulfonic acid, (2) terpolymers where two of the three monomers used to form said terpolymer are (meth) acrylic and 2-acrylamido-2-methyl propane sulfonic acid, and (3) mixtures thereof, where the amount of said polymeric scale inhibitor is from 0.5 part to 3.0 parts based upon 100 parts of corrosion inhibiting composition;

(e) water in an amount of 60 parts to 90 parts by weight bases upon the weight of the corrosion inhibiting composition.

2. The corrosion inhibiting composition of claim 1 which also contains a polymeric scale inhibitor, capable of controlling scale formation in an aqueous system, in an amount of 0.5 part to 3.0 parts by weight, based upon 100 parts of corrosion inhibiting composition.

3. The corrosion inhibiting composition of claim 2 wherein the anodic silicate salt is present in an amount of 10 parts to 20 parts by weight, the silicate salt stabilizer is present in an amount of 1.5 parts to 4.0 parts, the polymeric scale inhibitor capable of controlling scale formation in an aqueous system is present in an amount of 0.5 part to 1.5 parts by weight, the cathodic corrosion inhibitor is present in an amount of 1.0 part to 2.0 parts by weight, said parts based upon 100 parts of corrosion inhibiting composition.

4. A process for treating an open aqueous system comprising:

adding an effective corrosion inhibitive amount of a corrosion inhibiting composition to said aqueous system wherein said corrosion inhbiting composition comprises:

(a) an anodic silicate in the amount of 5 parts to 30 parts by weight based upon 100 parts of corrosion inhibiting composition;

(b) a silicate salt stabilizer having a weight average molecular weight from about 1000 to about 25,000, wherein said silicate salt stabilizer is a terpolymer comprising monomeric units selected from the group consisting of (i) (meth) acrylic acid, (ii) maleic acid, (iii) salts thereof, and (iv) mixtures of (i), (ii), or (iii); and where the silicate salt stabilizer is used in an amount of 1.0 parts to 5.0 parts by weight, based upon 100 parts of corrosion inhibiting composition;

(c) a cathodic corrosion inhibitor which is an anodic hydroxy phosphonic acetic acid salt in an amount of 0.5 parts to 4.0 parts, based upon 100 parts of corrosion inhibiting composition;

(d) a polymeric scale inhibitor selected from the group consisting of copolymers of (1)(meth)acrylic acid and 2-acrylamido-2-methyl propane sulfonic acid, (2) terpolymers where two of the three monomers used to form said terpolymer are (meth) acrylic and 2-acrylamido-2-methyl propane sulfonic acid, and (3) mixtures thereof, where the amount of said polymeric scale inhibitor is from 0.5 part to 3.0 parts based upon 100 parts of corrosion inhibiting composition;

(e) water in an amount of 60 parts to 90 parts by weight bases upon the weight of the corrosion inhibiting composition.

5. The process of claim 4 which also contains a polymeric scale inhibitor which is present in an amount of 0.5 part to 3.0 parts by weight, wherein said weight is based upon 100 parts of corrosion inhibiting composition.

6. The process of claim 5 wherein the anodic silicate salt is present in an amount of 10 parts to 20 parts by weight, the silicate salt stabilizer is present in an amount of 1.5 part to 4.0 parts, the polymeric scale inhibitor is present in an amount of 0.5 part to 1.5 parts by weight, and the cathodic corrosion inhibitor is present in an amount of 1.0 part to 2.0 parts by weight, wherein said weight is based upon 100 parts of corrosion inhibiting composition.

7. The process of claim 6 wherein the amount of corrosion inhibiting composition used to treat said aqueous system is from 0.1 mg/l to 500 mg/l based upon the liters of water treated.

8. The process of claim 7 wherein the amount of corrosion inhibiting composition used to treat said aqueous system is from 100 mg/l to 200 mg/l based upon the liters of water treated.

9. The process of claim 8 wherein the pH of said aqueous system to be treated is from 6.5 to 8.5.

10. The process of claim 9 wherein the pH of said aqueous system to be treated is from 7.0 to 8.0.

* * * * *